(12) United States Patent
Sant et al.

(10) Patent No.: US 9,598,314 B2
(45) Date of Patent: Mar. 21, 2017

(54) CORROSION INHIBITING CEMENTITIOUS COMPOSITIONS

(71) Applicants: The Regents of the University of California, Oakland, CA (US); Georgia Tech Research Corporation, Atlanta, GA (US)

(72) Inventors: Gaurav Sant, Los Angeles, CA (US); Magdalena Balonis-Sant, Los Angeles, CA (US); Kimberly E. Kurtis, Atlanta, GA (US)

(73) Assignees: THE REGENTS OF THE UNIVERSITY OF CALIFORNIA, Oakland, CA (US); GEORGIA TECH RESEARCH CORPORATION, Atlanta, GA (US)

( * ) Notice: Subject to any disclaimer, the term of this patent is extended or adjusted under 35 U.S.C. 154(b) by 75 days.

(21) Appl. No.: 14/399,499

(22) PCT Filed: May 6, 2013

(86) PCT No.: PCT/US2013/039776
§ 371 (c)(1),
(2) Date: Nov. 6, 2014

(87) PCT Pub. No.: WO2013/169675
PCT Pub. Date: Nov. 14, 2013

(65) Prior Publication Data
US 2015/0114267 A1    Apr. 30, 2015

Related U.S. Application Data

(60) Provisional application No. 61/643,858, filed on May 7, 2012.

(51) Int. Cl.
*C04B 7/02*    (2006.01)
*C04B 22/00*   (2006.01)
(Continued)

(52) U.S. Cl.
CPC ............ *C04B 22/0093* (2013.01); *C04B 7/02* (2013.01); *C04B 22/06* (2013.01); *C04B 28/04* (2013.01);
(Continued)

(58) Field of Classification Search
CPC ........................................................ C04B 7/02
See application file for complete search history.

(56) References Cited

U.S. PATENT DOCUMENTS 4,243,417 A    1/1981    Grourke et al.
5,296,300 A    3/1994    Carey, III et al.
(Continued)

FOREIGN PATENT DOCUMENTS

EP    0046057    8/1981
EP    0412686    2/1991
(Continued)

OTHER PUBLICATIONS

"Concrete containing TiO2: an overview of photocatalytic NOx abatement", Amadelli et al., RILEM Proceedings (2007), PRO 55 (Photocatalysis, Environment and Construction Materials), p. 155-163.*

(Continued)

*Primary Examiner* — Paul Marcantoni
(74) *Attorney, Agent, or Firm* — Foley & Lardner LLP; Cliff Z. Liu

(57) ABSTRACT

Provided herein is a cementitious composition comprising a photoactivator, wherein the photoactivator is capable of converting NOx to $NO_2-$ or $NO_3-$ when exposed to ultraviolet (U.V.) or visible light.

8 Claims, 1 Drawing Sheet

(51) Int. Cl.
C04B 28/04 (2006.01)
C04B 22/06 (2006.01)
C04B 111/20 (2006.01)
C04B 111/26 (2006.01)

(52) U.S. Cl.
CPC ... *C04B 2111/2061* (2013.01); *C04B 2111/26* (2013.01)

(56) References Cited

U.S. PATENT DOCUMENTS

| | | | |
|---|---|---|---|
| 6,331,585 B1 | 12/2001 | Merkel | |
| 6,409,821 B1 | 6/2002 | Cassar et al. | |
| 6,824,826 B1* | 11/2004 | Amadelli | B82Y 30/00 106/286.1 |
| 7,615,512 B2* | 11/2009 | Orth-Gerber | C09C 1/3669 423/445 R |
| 9,309,154 B2* | 4/2016 | Guerrini | C01G 23/047 |
| 2009/0209410 A1 | 8/2009 | Tsujimichi et al. | |
| 2010/0242806 A1 | 9/2010 | Droll | |
| 2010/0266470 A1* | 10/2010 | Ancora | B01D 53/885 423/239.1 |

FOREIGN PATENT DOCUMENTS

| | | | |
|---|---|---|---|
| KR | 102001008780 A | | 9/2001 |
| WO | WO 2011/045038 | * | 4/2011 |

OTHER PUBLICATIONS

KR 2002058946 Lee (Jul. 12, 2002) abstract only.*
KR 2002058946 (Jul. 12, 2002) Lee Machine Translation into English.*
Bethany Halford, "Building Small, Nanotechnology Makes Inroads in the Construction Industry," Chemical & Engineering News, (2011) vol. 89, No. 24 pp. 12-17.
Nick Dorman, "Material Developments: New Technologies and Their Implications for Building Construction," Owners Perspective (The Magazine of the Construction Owners Association of America) Oct. 10, 2011 (2011), http://www.ownersperspective.org/item/75-material-developments-new-technologies-and-their-implications-for-building-construction/75-material-developments-new-technologies-and-their-implications-for-building-construction, accessed Nov. 4, 2014.
Lamaka et al., Nanoporous Titania Interlayer as Reservoir of Corrosion Inhibitors for Coatings With Self-Healing Ability, Progress in Organic Coatings, (2007) vol. 58, Issues 2-3, 1, pp. 127-135.
Hosseinnia et al., "Photocatalytic Degradation of Organic Dyes with Different Chromophores by Synthesized Nano size TiO Particles," World Applied Sciences Journal, (2010) 8 (11): pp. 1327-1332.
Liu et al., "Synthesis, Characterization and Anticorrosion Performance of Modified TiO2 as Inhibitor," Advanced Materials Research, (2011) vols. 301-303, pp. 109-115.
Sophia Blaschke, "Are Photocatalytic Noise Barriers an Environmentally Sound Option?," Presented for the degree of Master's of Engineering and Public Policy Thesis at McMaster University, Hamilton, Ontario, Canada, Sep. 19, 2011, 89 pages.
Magdalena Balonis, "The Influence of Inorganic Chemical Accelerators and Corrosion Inhibitors on the Mineralogy of Hydrated Portland Cement Systems," Thesis presented for the degree of Doctor of Philosophy at the University of Aberdeen, Aberdeen, Scotland, Jun. 2010, 294 pages.
Burda et al., (2003), "Enhanced Nitrogen Doping in TiO2 Nanoparticles," Nano Lett., vol. 3, No. 8, pp. 1049-1051.
Chen, K. et al., "Photocatalytic cementitious material: Influence of the microstructure of cement paste on photocatalytic pollution degradation", Environmental Science & Technology, vol. 43, No. 23, 2009, pp. 8948-8952.
Dong et al., (2009), "One-Step "Green" Synthetic Approach for Mesoporous C-Doped Titanium Dioxide with Efficient Visible Light Photocatalytic Activity," J. Phys. Chem. C, 113, pp. 16717-16723.
He et al., (2008), "A Visible Light-Driven Titanium Dioxide Photocatalyst Codoped with Lanthanum and Iodine: An Application in the Degradation of Oxalic Acid," J. Phys. Chem., C 112, pp. 16431-16437.
Hong et al., (2005), "Visible-Light-Activated Nanoparticle Photocatalyst of Iodine-Doped Titanium Dioxide", Chem. Mater., 17, pp. 1548-1552.
In et al., (2007), "Effective Visible Light-Activated B-Doped and B,N-Codoped TiO2 Photocatalysts," J. Am. Chem. Soc., 129, pp. 13790-13791.
International Search Report and Written Opinion for International Application No. PCT/US2013/039776 dated Sep. 26, 2013.
Li et al., (2008), "Preparation of Polyaniline-Modified TiO2 Nanoparticles and Their Photocatalytic Active Under Visible Light Illumination," Applied Catalysis B: Environmental, 81, pp. 267-273.
Livraghi et al., (2006), "Origin of Photoactivity of Nitrogen-Doped Titanium Dioxide Under Visible Light," J. Am. Chem. Soc., 128, pp. 15666-15671.
Luo et al., (2004), "Photocatalytic Activity Enhancing for Titanium Dioxide by Co-doping with Bromine and Chlorine," Chem. Mater. 16, pp. 846-849.
Matschei, T. et al., "The AFm phase in portland cement", Cement and Concrete Research, 2007, vol. 37, No. 2, pp. 118-130.
Peng et al., (2008), "Preparation of Nitrogen-Doped Titanium Dioxide with Visible-Light Photocatalytic Activity Using a Facile Hydrothermal Method," Journal of Physics and Chemistry of Solids, 69, pp. 1657-1664.
Reddy et al., (2005), "S-, N- and C-Doped Titanium Dioxide Nanoparticles: Synthesis, Characterization and Redox Charge Transfer Study," Journal of Solid State Chemistry, 178, pp. 3352-3358.
Song et al., (2008), "Photocatalytic Activity of (Copper, Nitrogen)-Codoped Titanium Dioxide Nanoparticles," J. Am. Ceram. Soc., 91 (4), pp. 1369-1371.
Song et al., (2010), "Visible Light-Driven Iodine-Doped Titanium Dioxide Nanotubes Prepared by Hydrothermal Process and Post-Calcination," Applied Catalysis A: General, 378, pp. 169-174.
Xu et al., (2006), "Photocatalytic Effect of Carbon-Modified n-TiO2 Nanoparticles Under Visible Light Illumination," Applied Catalysis B: Environmental, 64, pp. 312-317.
Zhang et al., (2011), "A Highly Active Titanium Dioxide Based Visible-Light Photocatalyst with Nonmetal Doping and Plasmonic Metal Decoration," Angew. Chem., 123, pp. 7226-7230.

* cited by examiner

CORROSION INHIBITING CEMENTITIOUS COMPOSITIONS

CROSS REFERENCE TO RELATED APPLICATION

This application is a National Stage Entry of PCT/US2013/039776 filed on May 6, 2013, which claims benefit under 35 U.S.C. §119(e) of U.S. provisional application No. 61/643,858, filed May 7, 2012, the content of which is incorporated herein in its entirety by reference.

FIELD OF INVENTION

This technology relates to cementitious compositions that can inhibit and impede corrosion.

STATE OF THE ART

Efficient infrastructure is a critical driver for economic growth. Aging and premature failure of infrastructure limits a country's potential for economic growth. A substantial cause of such premature failure is the electrochemical corrosion of reinforcing steel embedded in concrete infrastructure or cementitious composition. Prevention, maintenance and replacement of materials due to metallic corrosion is estimated to consume ~5% of an industrialized country's income each year.

Corrosion of this nature initiates when the intrusion of chloride $Cl^-$ ions, accompanied by a drop in the pore solution pH, depassivates reinforcing steel rebar in the "covercrete". While efforts continue to limit corrosion by the use of stainless steel/epoxy coated rebar or corrosion inhibitors (e.g., CNIs or calcium nitrite and calcium nitrate inhibitors such as $Ca(NO_3)_2$ and $Ca(NO_2)_2$), aspects related to the cost/availability/efficiency/efficacy of materials have limited the use of these strategies. Corrosion mitigation in concrete bridge decks is particularly challenging, due to the combined effects of loading and environment, which can typically, include the application of $Cl^-$ containing deicing chemicals making $Cl^-$ induced corrosion common even in bridges remote from marine environments. At the same time, the potential for early age cracking in high surface area elements is amplified, increasing the rate at which aggressive chlorides may penetrate to the steel rebar. In a time of limited financial resources and environmental constraints, there is a need for a technology which can address this environmental/structural conservation.

SUMMARY

In one aspect, provided herein is a cementitious composition comprising 15-25 wt. % of an aluminate-ferrite-monosubstituent phase (AFm) and 0.001-5 wt. % of a photoactivator, wherein the photoactivator is capable of converting NO to $NO_2^-$ or $NO_3^-$ when exposed to ultraviolet (U.V.) or visible light. In one embodiment, the photoactivator comprises doped $TiO_2$. In one embodiment, the cementitious composition comprises 16-24 wt. %, 17-23 wt. %, 18-22 wt. % of AFm. In one embodiment, the cementitious composition comprises at least 15 wt. % of AFm, or at least 16 wt. % of AFm, or at least 17 wt. % of AFm, or at least 18 wt. % of AFm, and up to 25 wt. % of AFm or more. In one embodiment, the cementitious composition comprises at least 0.001 wt. %, or at least 0.01 wt. %, or at least 0.1 wt. %, or at least 0.5 wt. % of the photoactivator and up to 5 wt. % or more of the photoactivator. In one embodiment, the cementitious composition comprises 0.01-4 wt. %, or 0.1-3 wt. %, or 0.5-2 wt. % of the photoactivator. In one embodiment, the photoactivator is capable of converting $NO_x$ to $NO_2^-$ or $NO_3^-$ when exposed to visible light. In one embodiment, the photoactivator is substantially present topically or on the surface of the cementitious composition.

As used herein, wt. % refers to % by weight compared to the total weight of the cementitious composition. As used herein, "$NO_x$" refers to one or more of NO and $NO_2$. As used herein, "substantially" refers to 50% or more, or 75% or more or 90% or more by weight of the photoactivator being present topically, such that the photoactivator is accessible to U.V. or visible light and atmospheric $NO_x$.

The photoactivator can be applied as a layer (see FIG. 1 and its brief description) or a coating (see FIG. 2 and its brief description). As is readily understood by the skilled artisan in view of this disclosure, the photoactivator containing layer or coating can completely or partially cover the underlying concrete structure.

Also provided herein is a process of synthesis comprising contacting portland cement (or other hydraulic cement) with a sufficient amount of a composition comprising alumina and a sufficient amount of a photoactivator comprising doped $TiO_2$ under conditions suitable to provide a cementitious composition comprising 15-25 wt. % of AFm and 0.001-5 wt. % of the photoactivator. In one embodiment, up to about 75 wt. % of cement (e.g., about 25-75 wt. %, about 50-75 wt. %, or about 60-75 wt. %) is contacted with up to about 25 wt. % of a composition comprising alumina (e.g., about 5-25 wt. %, about 10-25 wt. %, or about 15-25 wt. %). In another embodiment, up to about 80 wt. % of cement (e.g., about 25-80 wt. %, about 50-80 wt. %, or about 60-80 wt. %) is contacted with up to about 20 wt. % of a composition comprising alumina (e.g., about 5-20 wt. %, about 10-20 wt. %, or about 15-20 wt. %). In another embodiment, 75 wt. % of portland cement or another hydraulic cement is contacted with 25 wt. % of a composition comprising alumina. In another embodiment, 80 wt. % of portland cement or another hydraulic cement is contacted with 20 wt. % of a composition comprising alumina. As used herein, the total weight of portland cement or another hydraulic cement and the composition comprising alumina is 100 wt. %. In another embodiment, a weight ratio of portland cement or another hydraulic cement to the composition comprising alumina is at least about 1.1, at least about 1.3, at least about 1.5, at least about 2, at least about 2.5, at least about 3, at least about 3.5, or at least about 4, and up to about 5, up to about 8, up to about 10, or more. In another embodiment, the composition comprising alumina comprises metakaolin, fly ash, or aluminous cements.

DETAILED DESCRIPTION

Figure 1:
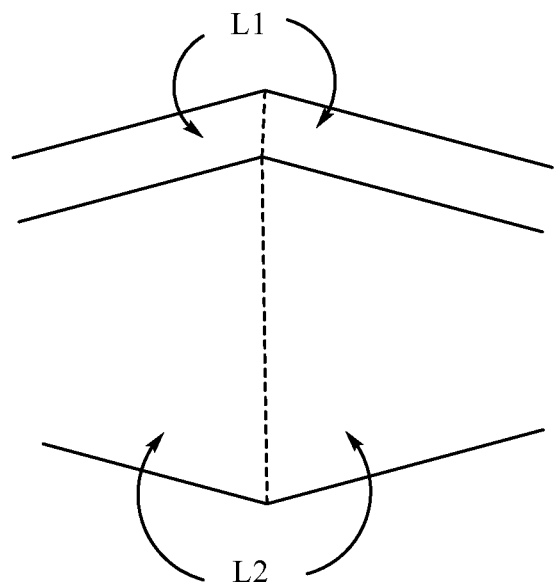
FIG. 1 illustrates an embodiment of a cementitious composition where the photoactivator is substantially present topically. In this embodiment, the cementitious composition comprises layers L1 and L2, where the photoactivator is substantially present in L1 in accordance with this technology. L1 can further contain concrete. L2 contains concrete containing 15-25% of AFm.
Figure 2:
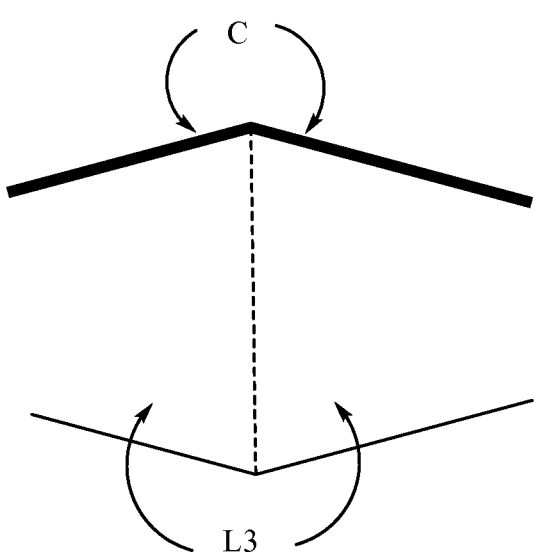
FIG. 2 illustrates an embodiment of a cementitious composition where the photoactivator is substantially present topically. In this embodiment, the cementitious composition comprises a coating C and a layer L3. The photoactivator is substantially present in coating C in accordance with this technology. L3 contains concrete containing 15-25% of AFm.

The solid phases in hydrated cement systems mainly include portlandite and a gel-like phase, a calcium silicate hydrate termed C—S—H. Alumina combines with water, calcium and sulfate to form mainly AFt (ettringite) and AFm phases. Portland cement pastes contain ~5-15% of combined amount of AFm and AFt.

AFm refers to a family of hydrated calcium aluminate hydrate phases. Its crystalline layer structure is derived from that of portlandite, $Ca(OH)_2$, but with about one third of the $Ca^{2+}$ ions replaced by a trivalent ion, such as $Al^{3+}$ or $Fe^{3+}$. The resulting charge imbalance gives the layers a positive charge which is compensated by intercalated anions (e.g. $SO_4^{2-}$, $OH^-$, $Cl^-$, $NO_3^-$, etc.); the remaining interlayer space is filled with $H_2O$. Its general formula is $[Ca_2(Al, Fe)(OH)_6] \cdot Y \cdot yH_2O$, where Y represents a monovalent ion or 0.5 of a divalent interlayer anion, as exemplified above, and y represents the number of water molecules. Studies have shown a multiplicity of AFm hydrate states and solid solution formation between various Y anions. Moreover, chloride and sulfate AFm phases form an anion-ordered compound, Kuzel's salt, e.g., with the 2:1 molar ratio of $[Cl]/[SO_4]$. AFm containing $Cl^-$, $OH^-$, and $CO_3^{2-}$ are also referred to as hydrocalumite. $SO_4$-AFm (monosulfoaluminate) is also referred to as kuzelite and Cl-AFm is referred to as Friedel's salt. The AFm content of a cementitious composition can be increased by increasing the amount of alumina present in the cement. The amount of $Al^{3+}$ ions can be controlled by adding aluminum-containing sources e.g. metakaolin, fly ash or aluminous cements.

AFt (aluminate-ferrite-trisubstituted) refers to $[Ca_3Al(OH)_6]_2(SO_4)_3 \cdot (24+2)H_2O$ (also known as $C_6AS_3H_{32}$) or ettringite, which is a product of hydration of $C_3A$ and gypsum. $C_3A$ refers to $3CaO \cdot Al_2O_3$.

In some embodiments of this technology, photoactivators include without limitation, doped $TiO_2$ such as, mesoporous carbon doped $TiO_2$ nanomaterials with anatase phase (see, Dong et al., J. Phys. Chem. C, 2009, 113, 16717-16723), lanthanum and iodine doped $TiO_2$ (see, He et al., J. Phys. Chem., C 2008, 112, 16431-16437), doped $TiO_2$ prepared by direct hydrolysis of tetrabutyl titanate through iodine-doping (see, Hong et al., Chem. Mater., 2005, 17, 1548-1552), boron doped $TiO_2$ (see, In et al., J. Am. Chem. Soc., 2007, 129, 13790-13791), polyaniline modified $TiO_2$ nanoparticles (see, Li et al., Applied Catalysis B: Environmental, 81 (2008) 267-273), nitrogen doped $TiO_2$ (see, Burda et al., Nano Lett., 2003, Vol. 3, No. 8, 1049-1051, Livraghi et al., J. Am. Chem. Soc., 2006, 128, 15666-15671 and Peng et al., Journal of Physics and Chemistry of Solids, 69 (2008) 1657-1664), bromine and chlorine doped $TiO_2$ (see, Luo et al., Chem. Mater. 2004, 16, 846-849), anionic sulfur, carbon, and nitrogen doped $TiO_2$ (see, Reddy et al., Journal of Solid State Chemistry, 178 (2005) 3352-3358), copper nitrogen doped $TiO_2$ (see, Song et al., J. Am. Ceram. Soc., 91 (4) 1369-1371 (2008)), iodine doped $TiO_2$ (see, Song et al., Applied Catalysis A: General, 378 (2010) 169-174), carbon modified $TiO_2$ (see, Xu et al., Applied Catalysis B: Environmental, 64 (2006) 312-317), and nitrogen and carbon doped $TiO_2$ (see, Zhang et al, Angew. Chem., 2011, 123, 7226 7230). Each of these references are incorporated herein by reference. Also useful according to the present technology are photoactivators which are capable of providing nitrite and nitrate species in aqueous solution by atmospheric $NO_x$ conversion.

In some embodiment, AFm is characterized as containing $OH^-$ and $SO_4^{2-}$ in anion positions. In some other embodiments, such as under service conditions or when calcium carbonate is added, the AFm phase may also contain carbonate. According to the present technology, the AFm phases are utilized to serve as a smart sink for $NO_2^-NO_3^-$ species generated during $NO_x$ oxidation, which can then be released into the pore solution during $Cl^-$ ingress. The presence of elevated levels of aqueous $NO_2^-$ and/or $NO_3^-$ species then inhibits steel corrosion. This approach which includes topical (e.g. coated or layered) and integral methods of anatase deployment is contemplated to be effective against steel corrosion as it is: (1) regenerative due to the continuous provisioning of $NO_2^-/NO_3^-$ species and (2) tunable: as linked to the $NO_x$ oxidation efficiency (related to the $TiO_2$ structure/properties) and cement chemistry which controls the AFm phase balance (i.e., content) in the system. The approach is applicable to high value structural elements, such as reinforced concrete bridge/decks with a large surface to volume ratio (i.e., exposed surface area) that are exposed to moisture and salt action and whose repair or replacement is expensive.

The light sensitivity and physical properties of the anatase are linked to the chemistry of the cement to develop an auto adaptive material which exhibits smart ion exchange behavior. An intelligent materials engineering (IME) program is followed to aid in materials design. Here, numerical tools including: (1) Gibbs free energy minimization methods are used to predict cementitious phase assemblages and anion exchange capacities, (2) reactive transport models are used to predict coupled fluid and ion effects as relevant to describe $NO_2^-$ $NO_3^-$ and $Cl^-$ transport and corrosion inhibition and (3) nanoparticle aggregation models are used to describe the role of $TiO_2$ particle properties/dispersion on photoactivity. Experimental studies are applied to describe the role of the overall cement composition, partial pressure (e.g., of $NO_x$, $O_2$, $H_2O$), electrochemical corrosion potential and fluid/ion transport. Further efforts evaluate the effect of topical or integral application of $TiO_2$ in organic/inorganic coatings or in the concrete bulk in terms of the efficiency/efficacy of each method. Spectroscopic methods are used to track interfacial changes and products on the $TiO_2$ and steel surface to describe $TiO_2$ fouling or steel corrosion.

The corrosion inhibitory efficacy of the compositions provided here are tested by various methods known in the art as illustrated and not limited by the following example.

EXAMPLE

Mixtures of $C_3A$, $CaSO_4$, $CaCl_2$, and the photoactivator are reacted at molar ratios indicated below under various partial pressures of $NO_x$ and $O_2$ with water at 25° C. and agitated in stoppered containers for 45 days. The container is made of a material that allows sufficient amount of visible or U.V. radiation to pass through it and reach the photoactivator inside it. Solutions and solids for analysis are obtained by separating the solid and liquid phases by filtration.

| Composition # | C$_3$A (moles) | CaSO$_4$ (moles) | CaCl$_2$ (moles) | Photoactivator (wt. % of total composition) |
|---|---|---|---|---|
| 1A | 0.01 | 0.01 | 0 | 0.5 |
| 2A | 0.01 | 0.01 | 0.005 | 0.5 |
| 3A | 0.01 | 0.01 | 0.0075 | 0.5 |
| 4A | 0.01 | 0.01 | 0.01 | 0.5 |

% of a photoactivator, while keeping the other components same as tabulated above. Various photoactivators, e.g. those capable of converting NO$_x$ to NO$_2^-$/NO$_3^-$ under U.V. or visible light are useful. The amount of NO$_2^-$ or NO$_3^-$ in the solid and the solution shows the conversion of NO$_x$ to NO$_2^-$/NO$_3^-$ under U.V. or visible light in the compositions provided herein and correlates to the corrosion protecting effect of the compositions provided herein.

The invention claimed is:

1. A cementitious composition comprising at least 16 wt. % a hydrated cement comprising of aluminate-ferrite-monosubstituent phase (AFm) and 0.001-5 wt. % of a photoactivator, wherein the photoactivator comprises doped TiO$_2$ and the photoactivator is capable of converting NO$_x$ to NO$_2^-$ or NO$_3^-$ when exposed to U.V. or visible light.

2. The cementitious composition of claim 1, wherein the photoactivator is capable of converting NO$_x$ to NO$_2^-$ or NO$_3^-$ when exposed to visible light.

3. The cementitious composition of claim 1, wherein 50% by weight or more of the photoactivator is present topically in the composition.

4. The cementitious composition of claim 3, wherein the photoactivator is coated.

5. The cementitious composition of claim 3, wherein the photoactivator is layered.

6. The cementitious composition of claim 1, comprising 18-22 wt. % of AFm.

7. The cementitious composition of claim 6, comprising 0.01-4 wt. % of the photoactivator.

8. The cementitious composition of claim 1, comprising at least 16 wt. % and up to 25 wt. % of AFm.

* * * * *